Patented Jan. 17, 1933

1,894,289

UNITED STATES PATENT OFFICE

BENJAMIN F. WOOD, OF RIDLEY PARK, PENNSYLVANIA, ASSIGNOR TO AMERICAN CHEMICAL PAINT COMPANY, OF AMBLER, PENNSYLVANIA, A CORPORATION OF DELAWARE

ART OF PURIFYING PHOSPHORIC ACID

No Drawing.   Application filed February 4, 1930.   Serial No. 425,820.

Phosphoric acid is often manufactured by admixing finely divided phosphate rock, sulphuric acid and water, so proportioned that a solution of phosphoric acid of a density of approximately 30° Bé. results. The essential part of the phosphate rock is the tricalcium phosphate, but in addition to this it contains mineral and organic matter which contaminates the resultant acid with objectionable impurities. Much of the impurities are in the form of suspended matter.

In order to eliminate this objectionable suspended matter, it has been proposed to calcine the rock and thus eliminate that portion of the suspended matter which is organic in nature. It has also been proposed to permit the acid to stand for long periods for the suspended matter to settle.

The suspended matter not only injures the purity of the acid, but it makes the concentration of the acid from the original gravity of 30° Bé. to the higher commercial strengths, a most difficult operation in that it causes excessive foaming which interferes greatly with heat transfer, thus lowering the thermal efficiency and it causes great waste of acid due to the difficulty of properly confining the foam to the evaporating apparatus.

The objects of this invention are, to overcome the necessity of calcining the phosphate rock used for making phosphoric acid; to diminish the time required for the suspended matter to settle out of crude phosphoric acid; to eliminate the foaming of phosphoric acid during the concentrating operation; to produce phosphoric acid of a higher purity than heretofore; to reduce the cost of manufacturing phosphoric acid and to generally improve the art of phosphoric acid manufacturing.

I have discovered that the suspended matter in phosphoric acid comprises electrically charged particles and that if the charges on these particles are neutralized, they settle in much shorter time than if the said charges are not neutralized. I have further discovered that these charges can be readily neutralized by introducing into the acid other particles which are charged oppositely to those already present in the acid.

I have found that finely divided sulphur acts well for my purpose and I have observed that the finer the particles of sulphur are, the more efficient they become, thus colloidal sulphur, such as is obtained from refining petroleum, acts better than flowers of sulphur.

Carrying my invention further, I find that it is not necessary to add the fine particles to the acid to be purified as such, but that the same effect is produced by adding substances, whose particles may be relatively large in volume, which react with the acid to be purified and generate directly within the acid solution, suitable particles. Such substances as sodium thiosulphate and sodium pentasulphide react in this fashion, producing small particles of sulphur, having sufficient electrical charges to produce the effect I desire. Of course these materials may first be dissolved in water or other solvent and then added to the acid to be purified, or substances of suitable chemical nature existing usually in the liquid state, such as lime-sulphur solution, may be used, in fact, any polysulphide, soluble in the acid solution, may be employed with more or less effect.

I have found that the finely divided sulphur which produces my desired result is positively charged and hence I have concluded that any finely divided particles so charged will produce a similar result.

Generally stated, my invention is the method of removing suspended matter from an aqueous solution of phosphoric acid which consists in admixing with the said acid finely divided matter possessing an electric charge, permitting the said finely divided matter to precipitate together with the said suspended matter and separating the resultant sludge from the purified acid.

Various substances will differ in the quantity required to produce the desired effect. The following table shows the amount of the substance required for 1,000 gallons of crude 30° Bé. acid:

Sodium thiosulphate_____ 100 pounds
Sodium pentasulphide_____ 32 pounds
Lime-sulphur solution (33° Bé.) 17 gallons To carry out my process commercially, I may add 100 pounds of sodium thiosulphate in the usual crystal form to 1,000 gallons of the crude phosphoric acid which has a gravity of approximately 30° Bé. and stir the admixture until the crystals are dissolved. I then permit the admixture to settle for ten hours. During this time the suspended matter will settle, together with the added material, leaving a relatively clear liquor which I decant to an evaporator and concentrate to the desired commercial strength.

My process may be carried out continuously as by the Dorr system, where the acid is passed through a number of agitators in series and then into a thickener from which the settled, suspended matter is continuously withdrawn and the clear liquor continuously decanted, by introducing my chemical into the agitator which feeds the thickener. When this is done the decanted liquor is practically free from suspended matter, the settled material is highly colored with organic matter and there is no foaming in the evaporators which are not the conditions met with where my chemical is not used, thus illustrating the effectiveness of my invention.

I claim:

The method of removing suspended organic matter from a non-oxidizing solution of phosphoric acid, comprising admixing with the said acid sodium thiosulphate to liberate sulphur in a finely divided state, permitting the said sulphur to precipitate together with the said suspended matter and separating the resultant sludge from the purified acid.

BENJAMIN F. WOOD.